Oct. 11, 1949.   L. M. SPERRY   2,484,319
RECIPROCATING SPINDLE TYPE COTTON HARVESTER
Filed Feb. 23, 1945   4 Sheets-Sheet 1

Inventor
Leo. M. Sperry
By
Attorneys

Oct. 11, 1949.  L. M. SPERRY  2,484,319
RECIPROCATING SPINDLE TYPE COTTON HARVESTER
Filed Feb. 23, 1945  4 Sheets-Sheet 3

Inventor
Leo. M. Sperry
By
Attorneys

Oct. 11, 1949.  L. M. SPERRY  2,484,319
RECIPROCATING SPINDLE TYPE COTTON HARVESTER
Filed Feb. 23, 1945  4 Sheets-Sheet 4
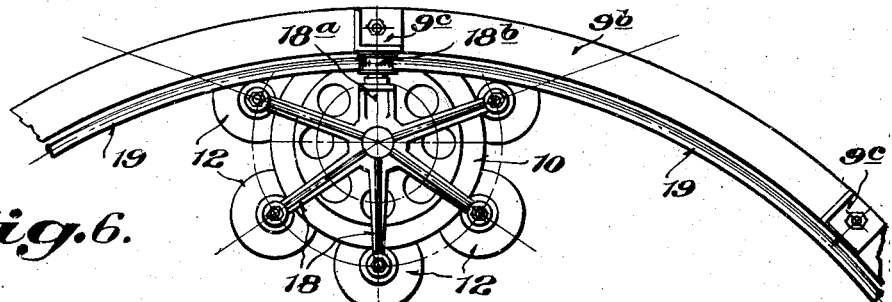
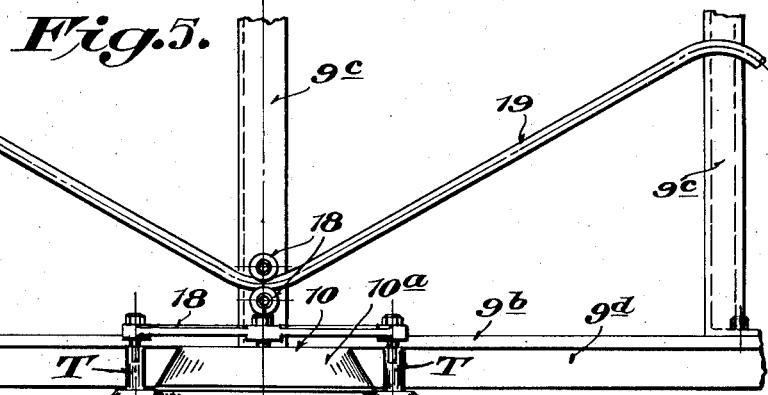
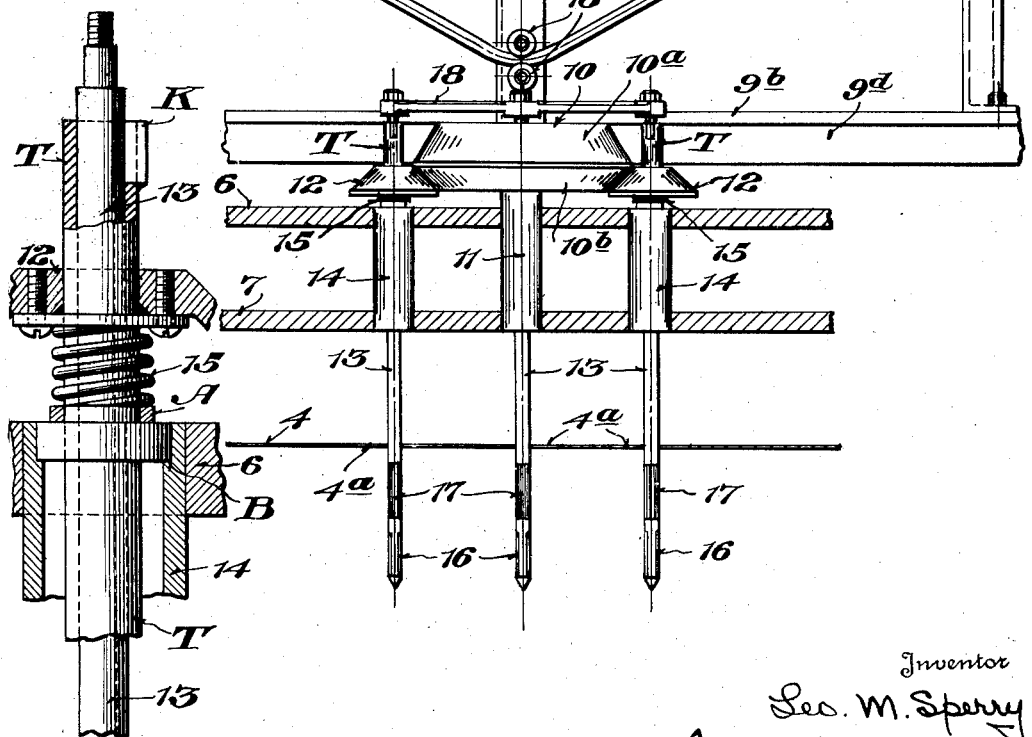

Patented Oct. 11, 1949

2,484,319

UNITED STATES PATENT OFFICE 2,484,319

RECIPROCATING SPINDLE TYPE COTTON HARVESTER

Leo Mark Sperry, Erie, Pa.

Application February 23, 1945, Serial No. 579,381

12 Claims. (Cl. 56—46)

This invention is an improvement in cotton picking machines adapted to harvest cotton in the field, and the principal object thereof is to provide a wheeled machine adapted to be drawn over successive rows of cotton plants, said machine having an axial tunnel extending therethrough for the reception of the row of cotton plants, reservoirs being formed behind the side walls at each side of the tunnel connected by ducts to suction devices, and opposed spindle clusters being provided on the opposed side walls of the tunnel adapted to be simultaneously rotated and reciprocated so as to enter the cotton plants as the machine is drawn along the row and extract the cotton from the bolls of the plant within the tunnel, the reciprocating motion of the spindles drawing the picked cotton into the reservoirs from whence the cotton is discharged and pneumatically transferred into bags carried by the machine.

Other objects of the invention are to provide a machine which will be light and inexpensive and which will meet the needs of both the large and small cotton grower; also a machine which may be used singly or in gangs so as to extract the cotton from one or a plurality of rows in the field; also to provide a machine having a relatively large number of picking spindles arranged in clusters throughout a substantial area of the sides of the tunnel and provided with simple and efficient means for rotating and reciprocating the spindle clusters, the speed of the reciprocating cotton picking spindles being in direct proportion to the ground speed of the machine as it passes along the cotton row.

Other minor objects of the invention will be hereinafter set forth.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Fig. 5 is an enlarged detail plan view partly in section showing a portion of a ground wheel and the associated cluster of spindles.

Fig. 6 is an elevation of parts shown in Fig. 7.

Fig. 7 is a detail section.

Figure 1:
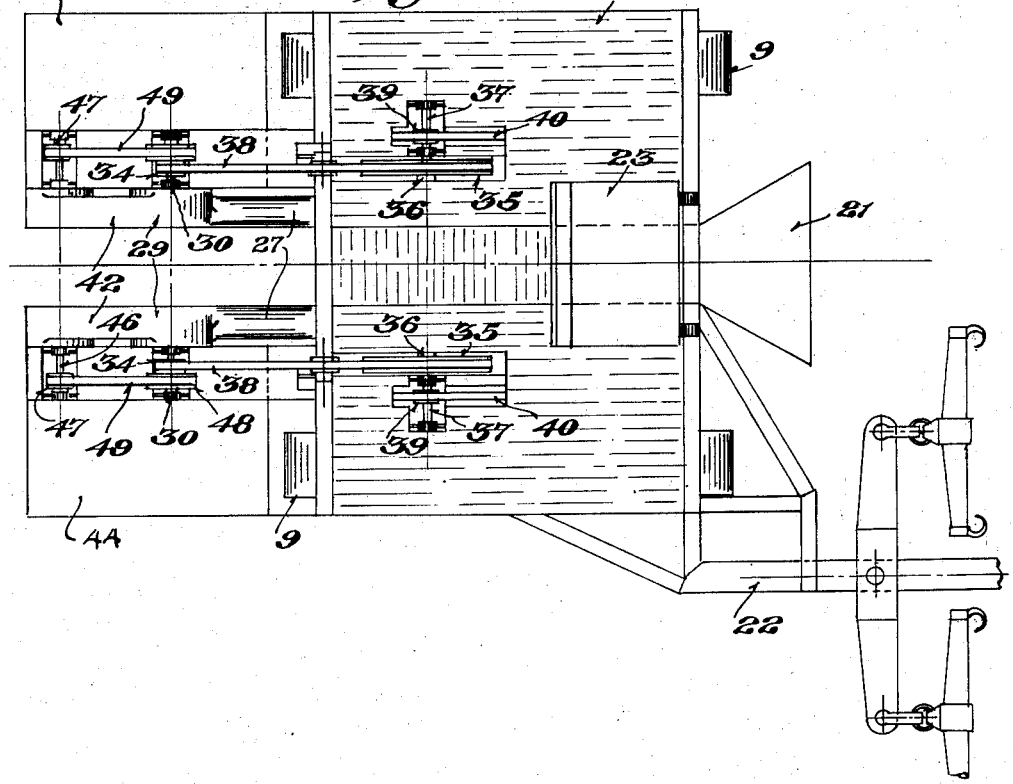
Fig. 1 is a top plan view of the machine.

As shown, the cotton picking machine preferably comprises a frame including a top plate 1, spaced bottom plates 2—2, which are shown spaced apart at the longitudinal center of the machine in Fig. 2, a horizontal plate 3 being disposed below top plate 1 at the central portion of the machine, with spaced vertically disposed plates 4 connecting the inner ends of the bottom plate 2 with the horizontal plate 3, leaving a space therebetween forming a longitudinal tunnel through the machine. The outer ends of the plates 1 and 2 are preferably connected by framing 5, thus forming a frame of substantially inverted U-shape. Extending between the plates 2 and 3 at each side of the tunnel are pairs of spaced vertical plates 6 and 7 secured thereto in any desired manner, the spaces between the plates 4 and 7 forming cotton receiving receptacles A for the purpose hereinafter set forth.

Figure 2:
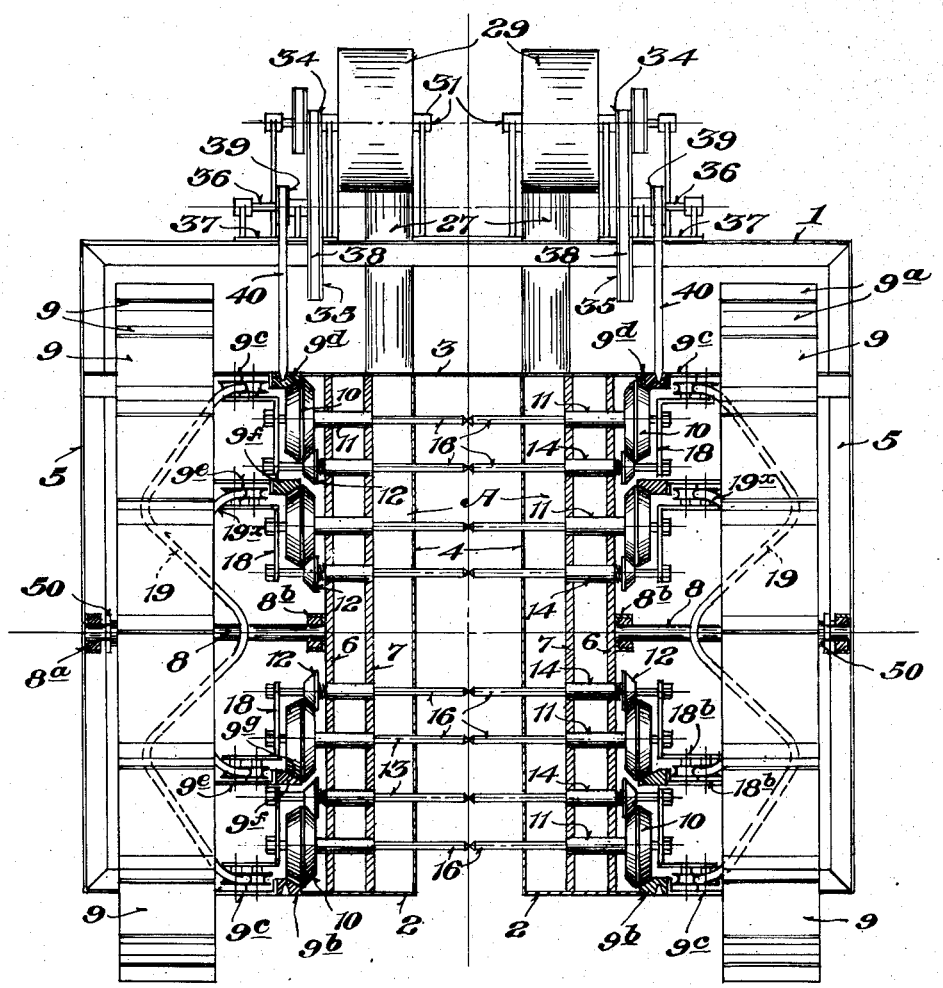
Fig. 2 is an enlarged end elevation of the machine, partly in section.

Rotatedly mounted in bearings 8a—8b carried by the frames 5 and plates 6 are axles 8 for ground wheels 9 provided with cleats 9a to insure good traction, said wheels 9 being disposed between outer frame members 5 and plates 6 as shown in Fig. 2.

At the inner side of each wheel 9 is an annular ring 9b of somewhat smaller diameter than the circumference of the wheel 9 and connected therewith by brackets 9c so as to rotate in unison therewith, each ring 9b being internally beveled at its outer end as at 9d, Fig. 2. Similarly mounted by means of brackets 9e extending from the wheel 9 are smaller annular rings 9f disposed concentrically with the rings 9b and in the same vertical plane therewith, said rings 9f being likewise internally beveled as at 9g, Fig. 2, for the purpose hereinafter set forth.

Figure 3:
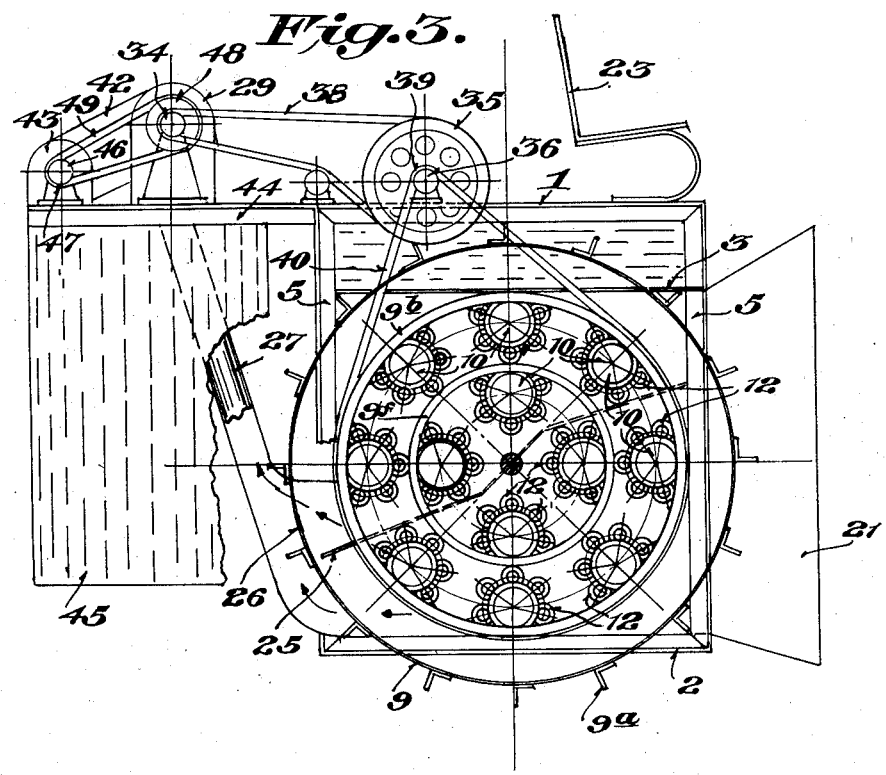
Fig. 3 is a side elevation of the machine shown in Fig. 1.

Contacting the beveled surface 9d of each ring 9b are conical wheels 10, eight such wheels 10 being shown in Fig. 3, each having an inner beveled portion 10a contacting the beveled portion 9d of ring 9b, said wheels 10 being disposed within the periphery of wheel 9, and being rotated thereby as the wheel 9 rotates. The bevel of portion 10a of each wheel is preferably disposed at 30° to the axis of the wheel. Each wheel 10 is journaled on a shaft housed in a bearing 11, Fig. 5, mounted between the fixed vertical walls 6—7 as shown in Figs. 2 and 5.

Each wheel 10 is also provided with an oppositely beveled outer portion 10b, preferably beveled at an angle of 45° to the axis of the wheel. Contacting the beveled portion 10b of clusters of correspondingly beveled or conical wheels 12, five being shown for each cluster, spaced around the wheel 10 within the periphery of ring 9b, as shown in Figs. 3 and 6, each wheel 12 being splined upon a hollow shaft T (Figs. 5 and 7) journaled in bearings 14 mounted between the fixed vertical walls 6 and 7 in a manner similar to the bearings 11 for wheels 10, said wheels 12 being rotated by contact with the beveled portions 10b of wheels 10. Coiled springs 15 (Fig. 5) are interposed between the wheels 12 and the adjacent ends of their antifriction bearings B for yieldably urging the beveled portions 10a of wheels 10 into contact with the beveled portions of rings 9d and the wheels 12 into contact with the beveled portions 10b of wheels 10 in order to maintain the parts 12, 10 and 9d in constant driving contact. Instead of using conical surfaces 9b, 10a, 10b, and 12 on the rings 9b and 9f, obviously toothed members may be utilized, the teeth being formed in the surfaces 9b, 10a, 10b and 12.

In order to relieve the side thrust on the ground wheels 9 due to the thrust of springs 15, which hold the wheels 10, 12 in contact with each other and the assembly in contact with the sinuous tracks 19 and 19x, I preferably provide thrust bearings 50 for the wheels 9 at the outer ends of the axles 8 which bearings 50 are adjustable to maintain the parts in operative driving relation.

Figure 4:
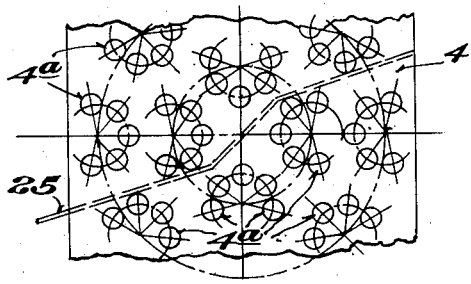
Fig. 4 is a partial plan view of one of the perforated side walls of the tunnel of the machine through which the spindle clusters project, and showing the grouping of spindles.

Spindles 13 are axially movable in hollow shafts T and are splined for rotation therewith; said spindles extending through said bearings B and through holes 4a (Figs. 4 and 5) in the vertical side walls 4 of the tunnel and each carries on its outer end a cotton picking tool 16 preferably in the form of a fluted file secured to the outer end of spindle 13 by means of flexible connecting members 17 preferably of rubber, so that the outer end of the tool 16 may have some degree of flexing in order to adjust itself to the cotton during picking and to prevent injury to the tool 16, and whereby each tool 16 may seek its own path in entering the cotton plant while in no way being retarded in its action of extracting the cotton from the boll of the plant.

The five spindles 13 of each cluster are connected at their inner ends to one spoke of a spider 18 having journaled on one spoke 18a a pair of spaced concave rollers 18b (Figs. 5 and 6) engaging opposite sides of a sinuous track 19 carried by the wheel 9, the undulations of said track through the instrumentality of spider 18 actuating each cluster of spindles 13 simultaneously to alternately extend same when at the inner crest of the track through the holes 4a of side plate 4 of the tunnel into cotton picking position shown in Figs. 2 and 5, and then to withdraw same into the reservoir space A between plates 4 and 7 (Fig. 2) when at the outer crest of sinuous track 19.

A similar arrangement of wheels 10, 12 and clustered spindles 13 engages the inner annular ring 9f of each wheel 9, and the spiders of the related chuted spindles 13 are actuated by inner sinuous tracks 19x (Fig. 2) in the same manner previously described, and therefore same needs no description herein.

In the arrangement shown in Fig. 3 there are sixty spindles 13 arranged in clusters of five each within the area of the outer ring 9b at each side of the tunnel, same being an ample number to efficiently extract the cotton from the bolls in the row of plants as the machine passes therealong. The sixty clustered spindles 13 arranged at each side of the tunnel are alternately projected from and retracted into their related reservoir A, so that as the machine is drawn coaxially of a row of cotton plants which are directed by the funnel 21 into the mouth of the tunnel through the machine, the fluted picking files or tools 16 on the spindles will cover a large and substantial portion of the area of the side walls 4, and will effectively pick the cotton from the bolls. When the rotating clustered spindles 13 are alternately projected as shown in Fig. 2, and then are retracted into the reservoirs A, the cotton on the tools 16 will be pushed off as the tools 16 are withdrawn within their hollow shafts T, and the freed cotton will drop into the related reservoirs A from where it is pneumatically removed, as hereinafter set forth.

The machine is preferably horse or tractor drawn by means of a tongue 22 (Fig. 1), the spacing between tongue 22 and the axis of the tunnel being equal to the spacing between adjacent rows of cotton plants. A driver's seat 23 is preferably disposed upon the top of the machine for directing the drawing means.

Within each reservoir A is a division plate 25 (Figs. 3 and 4) sloping rearwardly and downwardly, the cotton discharged from the tools 16 of the upper spindles 13 falling upon the plate 25 and moving towards the rear of the reservoir, while the cotton discharged from the tools 16 of the lowest spindles 13 falling upon the bottom plate 2 of the reservoir. At the rear end of each reservoir A is an opening 26 above and below the rear end of plate 25, said opening communicating with a duct 27 (Fig. 3) at each side of the machine extending rearwardly and upwardly into the inlet to a fan arranged in a casing 29 to create suction within the reservoirs A and tubes 27 so as to draw the picked cotton from reservoirs A into one side of said casing 29.

The shaft of the fan in casing 29 carries a belt pulley 34 thereon as shown in Figs. 1, 2 and 3 opposite a pulley 35 on a countershaft 36 journaled in bearings in a bracket 37 disposed upon the top plate 1 of the machine, pulley 35 being of larger diameter than pulley 34. A belt 38 runs around the aligned pulleys 34 and 35.

Countershaft 36 also carries a smaller pulley 39 disposed opposite the ring 9b of the related ground wheel 9, which ring is provided on its outer periphery with a belt groove; and a belt 40 runs around the pulley 39 and the ring 9b, whereby as each wheel 9 is rotated the rotated ring 9b will drive the fan shaft 31.

The outlet of casing 29 is connected by duct 42 with a supplementary fan casing 43 (Fig. 3) mounted on a rearward extension 44 of the machine below which is suspended bag 45, Fig. 3, receiving the picked cotton.

The shaft 46 of supplementary fan casing 43 is provided with a pulley 47 disposed opposite a pulley 48 on the shaft 31 of the main suction casing 29; and a belt 49 runs around pulleys 47 and 48 to drive the supplemental fan in casing 43.

In operation, as the machine is drawn along, straddling a row of cotton plants which pass through the tunnel on the underside of the machine, the picking tools 16 on the clustered spindles 13 will be reciprocated by engagement of the rolls 18b with the sinuous tracks 19 and 19x, and each cluster of spindles will be reciprocated in and out of the holes 4a in the side walls 4 of the tunnel, the speed of projection and retraction being governed entirely by the shape of the sinuous tracks 19 and 19x carried by the ground wheels 9. The flexible members 17 which connect the tools 16 with the spindles 13 permit the spindles to adjust themselves without hindrance and seek their own paths when entering the cotton plants to extract the cotton from the bolls. By the above construction the speed of rotation of the cotton picking tools 16 is in direct proportion to the speed of movement of the cotton picking machine when passing along the row of plants.

When the clustered tools 16 are projected the tools will, by rotation, extract the cotton from the bolls, whereupon the tools will be retracted within their related bearings T and the entwined extracted cotton will be pushed off the ends of the tools into the receptacles A from whence the extracted cotton will be moved by suction created by the main fan casing 29 through the outlets 26 above and below the division plate 25 and into the ducts 27. The cotton will then be drawn up through ducts 27 and into the fan casing 29, the cotton being passed through duct 42 into the bags 45. Separate suction units 29 and 43 are utilized to extract the cotton from the reservoirs A at opposite sides of the tunnel; each unit being operated by its respective ground wheel independently of the other.

My machine is light and inexpensive and meets the needs of both the small and large cotton grower. The machine may be horse drawn to pick one row; or more than one row may be picked up by staggered machines attached to the draw bar 22 towed by a tractor. By my novel arrangement for reciprocating spindles, a maximum number of picking tools 16 may be arranged in a given area to insure that all of the cotton in the row of plants is extracted from the bolls. Two such machines may be pulled in tandem if the cotton is so thick that one machine cannot pick the cotton clean as it passes over it once.

By adjusting the bearings 50 of ground wheels 9, the yieldable pressure of the parts 12, 10, 9b and 9f effecting rotation of the spindles 13 can be adjusted so as to insure that the spindles will be positively rotated in the desired manner.

I do not limit my invention to the exact form shown in the drawings, for obviously changes may be made therein within the scope of the claims.

I claim:

1. In a cotton picking machine, a frame having a longitudinally disposed tunnel, the opposed side walls of the tunnel being perforated and forming the outside walls of separate cotton receiving receptacles; ground wheels at opposite sides of the frame; sinuous annular tracks coaxially mounted on said wheels; annular members coaxially mounted on said wheels; series of spaced rotatable members journaled in the frame at opposite sides of the tunnel and rotated by the said annular members respectively; clusters of spindle rotating members spaced around and driven by their related rotatable members; spindles for the clusters splined in said clustered members and journaled in the frame and rotated as the ground wheels rotate; spiders connecting the ends of the spindles of each cluster; and means on each spider engaging its related sinuous track to cause reciprocation of the rotating spindles as the wheels rotate, whereby the rotating spindles will be projected in and out of the perforations in the walls of the tunnel as the wheels rotate.

2. In a machine as set forth in claim 1, said rings being beveled on their inner peripheries; said rotatable members comprising conical wheels journaled in the inner walls of the reservoirs engaging the beveled portions of the rings, said wheels having oppositely coned portions adjacent the reservoirs; and said clusters comprising conical drums engaging the oppositely coned portions of the wheels respectively.

3. In a machine as set forth in claim 1, cotton picking tools mounted on the ends of the spindles and adapted to be projected through the perforations in the opposed walls of the tunnel and to be retracted within the reservoir and within their related journals to free the picked cotton from the tools.

4. In a cotton picking machine, a frame having a longitudinally disposed tunnel; the opposed side walls of the tunnel being perforated and forming the outside walls of separate cotton receiving receptacles; ground wheels at opposite sides of the frame; sinuous annular tracks coaxially mounted on said wheels; said tracks being beveled; annular rings coaxially mounted on said wheels; series of spaced conical wheels journaled in the frame and engaging the beveled portions of the rings, said wheels having oppositely coned portions; clusters of conical drums spaced around and engaging the oppositely coned portions of the wheels respectively; spindles for the drums of each cluster upon which said drums are splined, said spindles being journaled in bearings in the frame and rotated as the ground wheels rotate; spiders connecting the ends of the spindles of each cluster; and means on each spider engaging its related sinuous track to cause reciprocation of the rotating spindles as the wheels rotate, said spindles being projected out of the perforations in the walls of the tunnel and retracted within the reservoir and within its related journal to free the picked cotton therefrom; and means for collecting the freed cotton discharged into said reservoir.

5. In a machine as set forth in claim 4, said rings on each ground wheel being arranged concentrically, and said conical wheels being arranged in inner and outer annular series.

6. In a machine as set forth in claim 4, said sinuous tracks on each ground wheel being arranged concentrically; and said clustered drums being arranged in inner and outer annular series.

7. In a machine as set forth in claim 4, compressed springs around said spindles of each cluster interposed between the conical drums and the adjacent ends of the spindle bearings for yieldably maintaining the conical wheels against the beveled portions of the rings and maintaining the conical drums against the oppositely coned portions of the conical wheels.

8. In a machine as set forth in claim 4, compressed springs around said spindles of each cluster interposed between the conical drums and the adjacent ends of the spindle bearings for yieldably maintaining the conical wheels against the beveled portions of the rings and maintaining the conical drums against the oppositely coned portions of the conical wheels; and adjustable thrust bearings on the axles of the ground wheels taking up the thrust exerted by said springs.

9. In a machine as set forth in claim 4, compressed springs around said spindles of each cluster interposed between the conical drums and the adjacent ends of the spindle bearings for yieldably maintaining the conical wheels against the beveled portions of the rings and maintaining the conical drums against the oppositely coned portions of the conical wheels, said ring engaging conical portion of the conical wheels being disposed at 30° to the axis of the wheels, and said oppositely coned portion being disposed at 45° to the axis of the wheels.

10. In a machine as set forth in claim 4, said reservoirs each having openings at their rear ends; sloping division plates extending rearwardly and downwardly within each reservoir terminating across the said openings therein; said collecting means comprising main suction fan casings on the frame for the respective reservoirs; ducts connecting the openings with the inlets of the fan casings respectively; removable bags at the rear end of the frame; outlet ducts leading from the outlets of the fan casings and discharging into the bags; and means for actuating the fans by the said rings on the ground wheels.

11. In a machine as set forth in claim 4, said reservoirs each having openings at their rear ends; sloping division plates extending rearwardly and downwardly within each reservoir terminating across the said opening therein; said collecting means comprising main suction fan casings on the machine frame for the respective reservoirs; ducts connecting the openings with the inlets of the fan casings respectively; said fan casings having partition plates dividing the casings into communicating inlet and outlet chambers; suction fans in the inlet chambers and gang saws journaled in the outlet chambers and extending through slits in the outlets of the chambers for feeding the cotton therethrough; removable bags at the rear end of the frame; outlet ducts leading from the outlets of the fan casings and discharging into the bags; supplementary fan casings operated by the first mentioned fan casings and disposed in the outlet ducts adjacent the bags, and means for actuating the fans by the said rings on the ground wheels.

12. In a machine as set forth in claim 4, tools on the ends of the spindles comprising fluted files; and flexible members connecting the files with the outer ends of the spindles.

LEO MARK SPERRY.

REFERENCES CITED

The following references are of record in the file of this patent:

UNITED STATES PATENTS

| Number | Name | Date |
| --- | --- | --- |
| 669,046 | Miles | Feb. 26, 1901 |
| 761,140 | Bowditch | May 31, 1904 |
| 999,714 | Gray | Aug. 1, 1911 |
| 2,261,572 | Smith | Nov. 4, 1941 |
| 2,279,598 | Smith | Apr. 14, 1942 |